United States Patent [19]

Ferrigno et al.

[11] Patent Number: 4,830,934
[45] Date of Patent: May 16, 1989

[54] ALLOY POWDER MIXTURE FOR TREATING ALLOYS

[75] Inventors: Stephen J. Ferrigno; Mark Somerville; William R. Young, all of Cincinnati, Ohio

[73] Assignee: General Electric Company, Cincinnati, Ohio

[21] Appl. No.: 56,175

[22] Filed: Jun. 1, 1987

[51] Int. Cl.4 .......................... B32B 15/00; B23P 6/04
[52] U.S. Cl. ..................................... 428/678; 428/668; 428/680; 75/255; 29/402.18; 228/119
[58] Field of Search ............................... 228/119, 194; 29/402.18; 419/6; 75/255, 251, 246; 428/678, 680, 668; 148/127

[56] References Cited

U.S. PATENT DOCUMENTS

| | | | |
|---|---|---|---|
| 3,073,269 | 1/1963 | Hoppin et al. | 113/110 |
| 3,155,491 | 11/1964 | Hoppin et al. | 75/0.5 |
| 3,759,692 | 9/1973 | Zelahy | 75/0.5 BA |
| 4,059,217 | 11/1977 | Woodward | 228/263.13 |
| 4,073,639 | 2/1978 | Duvall et al. | 75/0.5 |
| 4,098,450 | 7/1978 | Keller et al. | 228/119 |
| 4,285,459 | 8/1981 | Baladjanian et al. | 228/119 |
| 4,299,629 | 11/1981 | Haack | 75/251 |
| 4,381,944 | 5/1983 | Smith et al. | 75/255 |
| 4,389,251 | 6/1983 | Simm et al. | 75/255 |
| 4,478,638 | 10/1984 | Smith et al. | 75/255 |
| 4,493,451 | 1/1985 | Clark et al. | 228/119 |
| 4,657,171 | 4/1987 | Robins | 228/119 |
| 4,705,203 | 11/1987 | McComaz et al. | 228/119 |

Primary Examiner—John J. Zimmerman
Attorney, Agent, or Firm—Derek P. Lawrence; Stephen S. Strunck

[57] ABSTRACT

An improved mixture of alloy powders is provied for use in treating a preselected article alloy, for example, to repair or join multiple components of the article. The mixture has at least three distinct groups of alloy powders which together define a mixture composition range, with each alloy powder of the groups characterized by a composition and melting range different from the others and from the article alloy. In a preferred form, the mixture composition range comprises, by weight, 15-30% Cr, 1.5-6% W, 0.4-4% Al, 1-11% Ti, 1-6% Ta, up to 1.5% B, up to 0.5% Si, up to 0.2% Zr, up to 3% Mo, up to 0.3% Hf, up to 6% Cb, up to 2% Re, with the balance selected from Co and Ni along with incidental impurities.

20 Claims, No Drawings

ALLOY POWDER MIXTURE FOR TREATING ALLOYS

BACKGROUND OF THE INVENTION

1. Field of the Invention

This invention relates primarily to the repair of alloy articles and, more particularly, to a powder mixture for the repair of cobalt base and nickel base superalloys and to the repaired article.

2. Description of the Prior Art

High temperature cobalt base and nickel base superalloys are used in the manufacture of high temperature operating gas turbine engine components including combustors and turbine vanes and blades, among others. During operation of such components under strenuous, high temperature operating conditions, various types of damage or deterioration can occur. For example, cracks can result from thermal cycling, from foreign object impact, etc. Also, such components can experience damage, such as cracks and inclusions, during manufacture. It is well known that the cost of such components of high temperature cobalt base and nickel base superalloys is relatively high. Accordingly, it is more desirable to repair such components than to replace them with new ones.

The repair and cleaning of certain superalloy articles, for example using fluoride ions, is described in U.S. Pat. No. 4,098,450-Keller et al, issued July 4, 1978, and assigned to the assignee of the present invention. Other methods, particularly useful in connection with cobalt base alloys, include first cleaning the article in a reducing atmosphere such as hydrogen, or mechanically removing damages portions, and then repairing the damaged or cracked portion by vacuum brazing-type techniques. Such methods have used alloy powders or mixtures of powders such as the powder described in U.S. Pat. No. 3,759,692-Zelahy, patented Sept. 18, 1973, or mixtures of powders such as described in U.S. Pat. Nos. 4,381,944-Smith, Jr. et al, patented May 3, 1983 or U.S. Pat. No. 4,478,638-Smith, Jr. et al, patented Oct. 23, 1984.

With the introduction of more recent, higher strength and more highly alloyed superalloys, it has been found that such known alloy systems or mixtures of powders would either not fill or repair the cracks or defects properly, or had less than desirable material characteristics, or seriously affected the parent or substrate alloy.

SUMMARY OF THE INVENTION

It is a principal object of the present invention to provide an improved alloy powder mixture which can be used to repair high strength, highly alloyed cobalt base and nickel base superalloys.

It is another object of the present invention to provide an improved superalloy article including a repair portion having high strength and unique microstructure matched with the microstructure of the alloy being repaired.

Still another object is to provide an improved method for using such powder mixture in the repair of superalloys.

These and other objects and advantages will be more fully understood from following detailed description, and examples, all of which are intended to be representative of rather than in any way limiting on the scope of the present invention.

Briefly, the present invention provides an improved mixture of alloy powders for use in treating a preselected nickel base or cobalt base article alloy of predetermined composition range, at a temperature less than the incipient melting temperature of the alloy article. The mixture has at least three distinct groups of alloy powders which in combination define a mixture composition range. Each alloy powder of the groups is characterized by a composition and melting range different from the others and from the article alloy. A first of the groups consists of at least one alloy, each such alloy with a melting range higher than the melting ranges of the alloys in the other groups. Alloys of the first group are further characterized by substantially all of elements selected from W and Mo, substantially all of any C included in the mixture composition and, in the cobalt base form, the lower total weight percent of melting point depressants selected from B and Si when compared with a second group. The second of the groups has at least one alloy, each such alloy having a melting range lower than the alloys in the first group. The second group is further characterized by the substantial absence of elements selected from the W and Mo and of C. The second group alloys comprise Cr, Al and at least one of the elements Ni and Co. A third of the groups has at least one eutectic alloy, with each alloy of the third group having a melting range lower than the alloys of the second group. The third group is further characterized by the substantial absence of C. The mixture composition range comprises less than 2 wt % total of B and Si, less than 1 wt% carbon, along with strengthening and hardening elements of the article alloy. A preferred mixture composition range comprises, by weight, 15–30% Cr, 1.5–6.5% W, 0.4–4% Al, 1–11% Ti, 1–6% Ta, up to 1.5% B, up to 0.5% Si, up to 0.2% Zr, up to 3% Mo, up to 0.3% Hf, up to 6% cb, up to 2% Re, with the balance selected from Ni and Co along with incidental impurities.

In a preferred form particularly for use with cobalt base superalloys, the mixture composition range consists essentially of, by weight, 15–30% Cr, 2–7% W, 0.4–1.5% Al, 1–4% Ti, 2–6% Ta, 0.5–2% B, up to 0.5% Si, up to 0.2% Zr, 9–15% Ni, with the balance Co along with incidental impurities. In a preferred form particularly for use with nickel base superalloys, the mixture composition range comprises, by weight, 15–25% Cr, 1.5–4% W, 0.5–4% Al, 2–11% Ti, 1–4% Ta, up to about 1% B, 2–30% Co, 1–3% Mo, 0.1–0.3% Hf, 0.5–6% Cb, up to 2% Re, with the balance Ni along with incidental impurities.

The method associated with the present invention includes cleaning the alloy article, particularly at the area which is to be repaired, disposing the powder mixture at the repair area, heating the article or repair area in a first temperature range below the incipient melting temperature of the alloy of the article, such as in the range 2125°–2275° F., for example of about 2175°–2225° F., for a time sufficient to flow at least a portion of the powder mixture at the repair and thereafter heating the repair at a second temperature in a range preferably below the first temperature, for example in the range of about 2000°–2125° F. for at least about eight hours to diffuse at least a portion of the powder mixture with the cobalt base structure and with itself.

The repaired article resulting from practice of the method and use of the powder mixture of the present invention includes a repair area having a unique microstructure characterized by a fine, discrete dispersion of second phase borides or carbides or both as well as strength properties at least approaching the strength of the superalloy which had been repaired.

DESCRIPTION OF THE PREFERRED EMBODIMENTS

Use of known repair alloy systems and methods on certain modern cobalt base alloys of relatively high mechanical strength properties has been found to be unsatisfactory from a microstructural as well as a mechanical strength viewpoint. For example, use of a commercially available cobalt base alloy which has been identified as Mar M 302 alloy, having relatively high mechanical strength properties and currently used as the alloy from which certain high pressure turbine vanes are manufactured, has identified the need for a new repair alloy system and method. The nominal composition of Mar M 302 alloy is, by weight, 21.5% Cr, 10% W, 9% Ta, 0.75% Ti, 1% C, 1% (max) Si, balance Co and incidental impurities. The melting range of MAR M 302 alloy is about 2400°–2450° F. Another commercially used alloy for such general purposes is one identified as WI52 and having a nominal composition, by weight, of 21% Cr, 11% W, 2% Cb, 2% Fe, 0.45% C, balance Co and incidental impurities. The melting range of WI 52 alloy is about 2400°–2450° F. With the introduction of newer, higher strength and more highly alloyed superalloys, it became apparent that existing alloy systems and methods were not suitable for repair: the alloy system either would not fill the defects properly or resulted in an undesirable material interaction.

The present invention, in one form, provides an improved mixture of alloy powders useful in the repair of certain of such relatively high strength, highly alloyed superalloys and articles made therefrom. During evaluation of present invention, it was recognized that in a repair alloy system for use with such higher strength materials, it was necessary to include strengthening and hardening elements of the article alloy being repaired and yet provide for adequate flow characteristics to facilitate placement and insertion of the repair alloy system at desirable locations during conduct of the repair process. In addition, it is desirable to generate a microstructure which is compatible and preferably closely matched with the microstructure of the article alloy after completion of the repair.

The present invention provides such capabilities through an improved mixture of distinct groups of alloy powders which are combined into the improved mixture. Each of the groups includes at least one alloy powder.

Each alloy of a first of the groups has a melting range higher than the melting ranges of the alloys of the other groups and includes substantially all of the solid solution strengthening elements selected from W and Mo along with substantially all of any C which might be included in the mixture composition: the total analysis composition of the entire mixture. The function of the first group is to include a large portion of strengthening and hardening elements of the article alloy and, in the cobalt base form, to exclude substantially all of the melting point depressants selected from B and Si when compared with a second of the groups. In this way, the first group provides high strength and compatible microstructure to a repaired portion of an article.

Each alloy of the second of the alloy powder groups has a melting range lower than the alloys of the first group. The second group provides additional strengthening and oxidation resistant elements along with flow assistance to the system. Therefore, the alloys of the second group comprise Cr, Al, and at least one element selected from Ni and Co.

A third of the groups of alloy powders has at least one eutectic alloy, generally of the binary or ternary eutectic type. In the examples used in this description, the term "eutectic" means a mixture of one or two elements with either Ni or Co that results in an alloy with a designated melting point below the brazing temperature. Each such third group alloy powder has a melting range lower than alloys of the second group. They function to provide flow to the mixture in a preselected temperature range, selected as a function of the alloy of the article being repaired, and to provide alloying additions. For example, in the cobalt base form of the present invention, alloying additions such as Ti are provided for the control of B outside of its role as a temperature depressant, such as B diffusion into the article alloy.

For use in treating a preselected article alloy, particularly cobalt base, the mixture composition range of the present invention consists essentially of, by weight, 15–30% Cr, 2–7% W, 0.4–1.5% Al, 1–4% Ti, 2–6% Ta, 0.5–2% B, up to 0.5% Si, up to 0.2% Zr, up to 3% Mo, up to 0.3% Hf, up to 1% Cb, with the balance selected from Co and Ni along with incidental impurities.

During the evaluation of the present invention a variety of first, second and third group alloys were tested in various combinations. Some of such alloys useful with both Co-base and Ni-base alloy articles are shown, according to group, in the following Table I. Combinations of such individual alloys into a mixture of alloy powders for evaluation in connection with the present invention are shown in Table II.

TABLE I

| | NOMINAL COMPOSITION RANGE (wt % plus incidental impurities) | | | | | | | |
|---|---|---|---|---|---|---|---|---|
| | 1ST GROUP | | | | 2ND GROUP | | 3RD GROUP | |
| ELEMENT | ALLOY 1 | ALLOY 2 | ALLOY 3 | ALLOY 4 | ALLOY 5 | ALLOY 6 | ALLOY 7 | ALLOY 8 |
| C | | 0–1 | | | | | | |
| Cr | 34–36 | 17–20 | 3–4 | 34–36 | 25–28 | 14–16 | 15–16 | |
| W | 9–11 | 9–11 | 11–14 | 9–11 | | | | |
| Ni | 13–14 | | | | | Bal | | |
| Al | | | | | 2–3 | 3–4 | | |
| Ti | | | | | 5–7 | | | 16–23 |
| Ta | | 8–11 | 13–15 | 9–11 | | 3–4 | | |
| B | | | | | 0.5–1 | 2–3 | 2–4 | |
| Si | | | | | 1–1.3 | | | |
| Zr | | | | | 0.4–1 | | | |
| Co | Bal | Bal | Bal | Bal | Bal | 9–11 | Bal | Bal |
| Melting | >2400 | >2400 | >2400 | >2400 | 2175– | 2150– | 2025– | 2100– |

TABLE I-continued

NOMINAL COMPOSITION RANGE
(wt % plus incidental impurities)

| | 1ST GROUP | | | | 2ND GROUP | | 3RD GROUP | |
|---|---|---|---|---|---|---|---|---|
| ELEMENT | ALLOY 1 | ALLOY 2 | ALLOY 3 | ALLOY 4 | ALLOY 5 | ALLOY 6 | ALLOY 7 | ALLOY 8 |
| Range °F. | | | | | 2200° F. | 2175° F. | 2050° F. | 2150° F. |

TABLE II

NOMINAL MIXTURE COMPOSITION (wt % plus impurities)

| POWDER MIXTURE (% OF TOTAL) | | Cr | W | Ni | Al | Ti | Ta | B | C | Si | Zr | Co |
|---|---|---|---|---|---|---|---|---|---|---|---|---|
| L2 | 1st Group - 27% Alloy 1, 18% Alloy 2 | 19.4 | 3.7 | 14.2 | 0.5 | 1.9 | 2.0 | 1.4 | | | | Bal |
| | 2nd Group - 15% Alloy 6 | | | | | | | | | | | |
| | 3rd Group - 30% Alloy 7, 10% Alloy 8 | | | | | | | | | | | |
| L2M1 | 1st Group - 20% Alloy 1, 15% Alloy 2, 20% Alloy 3 | 15.2 | 6.1 | 9.5 | 0.4 | 1.9 | 4.1 | 1.1 | | | | Bal |
| | 2nd Group - 10% Alloy 6 | | | | | | | | | | | |
| | 3rd Group - 25% Alloy 7, 10% Alloy 8 | | | | | | | | | | | |
| SA1 | 1st Group - 50% Alloy 4 | 27.7 | 4.5 | 9.8 | 1.0 | 1.5 | 5.5 | 0.8 | | 0.3 | 0.15 | Bal |
| | 2nd Group - 25% Alloy 5, 15% Alloy 6 | | | | | | | | | | | |
| | 3rd Group - 10% Alloy 7 | | | | | | | | | | | |
| SA106 | 1st Group - 25% Alloy 4, 25% Alloy 5, 25% Alloy 7 | 21.4 | 2.5 | 9.8 | 1.1 | 3.4 | 3.0 | 1.3 | | 0.28 | 0.18 | Bal |
| | 2nd Group - 15% Alloy 6 | | | | | | | | | | | |
| | 3rd Group - 10% Alloy 8 | | | | | | | | | | | |

During the evaluation of the alloys shown in the above Tables I and II, for use with the high strength cobalt base superalloys of the Mar M302 and WI52 type described above, it was recognized that certain elements should be maintained within the limits of the present invention to avoid detrimental results in the joint or repaired portion. For example, in the Co base form of the mixture of the present invention, it was found that Al in amounts in the mixture composition greater than about 1.5 wt. % resulted in voiding; Ti below about 1 wt. % resulted in large amounts of Chinese script phase formation in the parent or structural material; whereas above 4 wt. % Ti was too high resulting in a Ti network along the brazed or joined interface. Chinese script is a large blocky eutectic structure usually reported as a $Cr_x B_y$ phase in braze material. Normally such a phase is undesirable. In such form, Ni below 8 wt. % promotes such script formation, and Ta below 2 wt. % and Cr over 30 wt. % promotes extremely rapid oxidation.

An important element in the mixture of the present invention is Ta which is a solution strengthener and, in addition, assists with B entrapment: Ta changes the diffusivity of B across the joint or repair interface. In the cobalt base form of the present invention represented by Tables I and II, less than about 1.8 wt. % Ta was too weak and led to the formation of Chinese script phase, whereas greater than about 6 wt. % Ta resulted in a mixture having flow characteristics too slow to fill adequately a defect in a practical time.

Boron is the principal melting point depressant in the mixture. Greater than about 1.5 wt. % B resulted in incipient melting and boron infiltration into the parent or structural article alloy. The lower limit is selected to provide adequate flow to the mixture.

In the form of the present invention represented by Tables I and II, Ni in the range of 8-15 wt. % reacts with Chinese script phase to keep such phase fine in the brazed matrix. In some examples, the element C was added to help decrease porosity in build up areas, and it was found that up to 0.2% total carbon can be tolerated in the mixture composition. These elements, along with Cr for oxidation resistance and W and/or Mo for solid solution strengthening, help define the alloy mixture of the present invention. The addition of Ta and W, in combination with Cr, in the mixture composition of the present invention helps control the formation of the $Cr_x B_y$ script phase and allows for greater homogenization through the subsequent diffusion process. Si and Zr function to enhance flow characteristics.

The present invention requires the intermixing of the three above described groups of alloy powders to form the mixture of the present invention in order to introduce into the total mixture the required level of elements. The first group of alloy powders provides the principal amounts of strengthening elements and those required to provide a match with parent metal or article alloy microstructure. The second group of alloys functions to add Ni and/or Co to the mixture and assists with the strengthening and flow characteristics. The third group of alloys, the eutectics, provides flow as well as additional alloying which assists in the control of B: Ti helps to avoid B diffusion into the parent or structural metal while B functions as a melting point depressant and provides adequate flow during processing. For example, the above described WI52 alloy is sensitive to B infiltration which would result in a decrease in its incipient melting temperature. However, a reduction in the B in the mixture of the present invention would reduce its flow. Therefore, the system of the present invention, for example, through the use of Ti in the eutectic alloy of the third group, is designed to inhibit such occurrence. In other forms of the present invention, Ta in the third group alloys, in the absence of Ti, can perform the same function where needed.

Additional evaluation of the present invention particularly with Ni-base superalloy articles involved the powdered alloys and powder mixtures shown in the following Tables III and IV. In this form, the Co functions primary as a high temperature gamma prime strengthener, and Al and Ti together are gamma prime formers. Hf functions, at least in part, as a flux, whereas Cb is a gamma-gamma prime former. Re is added as a matrix strengthener at high temperatures and is thought to improve stress rupture properties.

TABLE III

| | NOMINAL COMPOSITION RANGE (wt % plus incidental impurities) | | | | | | | |
|---|---|---|---|---|---|---|---|---|
| | 1ST GROUP | | 2ND GROUP | | 3RD GROUP | | | |
| ELEMENT | ALLOY 9 | ALLOY 10 | ALLOY 6 | ALLOY 11 | ALLOY 7 | ALLOY 12 | ALLOY 13 | ALLOY 14 |
| Cr | 6–8 | 9–11 | 14–16 | 34–36 | 15–16 | 25–30 | | |
| W | 9–11 | 4–6 | | | | | | |
| Ni | Bal | Bal | Bal | Bal | | Bal | Bal | Bal |
| Al | | 5–7 | 3–4 | 1–2 | | | | |
| Ti | | 0.5–1.5 | | 11–12 | | | 34–38 | 34–38 |
| Ta | 7–9 | 2–4 | 3–4 | | | | | |
| B | | | 2–3 | | 2–4 | | 0.8–1.2 | |
| Co | 9–11 | 3–5 | 9–11 | 3–5 | Bal | | | |
| Mo | 2–4 | 4–6 | | | | | | |
| Hf | 0.5–0.7 | 0.3–0.6 | | | | | | |
| Cb | | | | 2–4 | | 21–25 | | |
| Re | | 2–4 | | | | | | |
| Melting Range (°F.) | >2300° F. | >2300° F. | 2150–2175° F. | 2175–2200° F. | 2025–2050° F. | 2130–2150° F. | 2050–2075° F. | 2075–2100° F. |

TABLE IV

| POWDER MIXTURE (% OF TOTAL) | | NOMINAL MIXTURE COMPOSITION (wt % plus impurities) | | | | | | | | | | | |
|---|---|---|---|---|---|---|---|---|---|---|---|---|---|
| | | Cr | W | Ni | Al | Ti | Ta | B | Co | Mo | Hf | Cb | Re |
| SA-813 | 1st Group - 40% Alloy 9<br>2nd Group - 10% Alloy 6, 25% Alloy 11<br>3rd Group - 25% Alloy 7 | 17 | 4 | Bal | 0.7 | 2.9 | 3.7 | 1 | 26.4 | 1.2 | 0.24 | 0.75 | |
| SLI-167 | 1st Group - 50% Alloy 10<br>2nd Group - 10% Alloy 6, 20% Alloy 11<br>3rd Group - 20% Alloy 12 | 18.9 | 2.5 | Bal | 3.5 | 2.7 | 1.8 | 0.25 | 3.8 | 2.5 | 0.25 | 5.2 | 1.5 |
| MLI-319 | 1st Group - 50% Alloy 10<br>2nd Group - 20% Alloy 11<br>3rd Group - 20% Alloy 12, 10% Alloy 13 | 17.5 | 2.5 | Bal | 3.3 | 6.3 | 1.5 | 0.1 | 2.8 | 2.5 | 0.25 | 5.3 | 1.5 |
| ST-541 | 1st Group - 36% Alloy 10<br>2nd Group - 54% Alloy 11<br>3rd Group - 10% Alloy 14 | 22.5 | 1.8 | Bal | 3.0 | 10.2 | 1.1 | | 3.6 | 1.8 | 0.16 | 1.6 | 1.1 |
| SLI-1000 | 1st Group - 55% Alloy 10<br>2nd Group - 35% Alloy 11<br>3rd Group - 10% Alloy 13 | 17 | 3 | Bal | 3.7 | 7.5 | 2 | 0.1 | 4 | 3 | 0.3 | 1.1 | 2 |

EXAMPLE 1

Coupons for testing were cut from the convex and concave airfoils of a gas turbine engine high pressure turbine vane of the above described Mar M302 alloy and of WI52 alloy. After flattening, the coupons were notched with a 0.015 inch saw cut and then cleaned to remove all surface coating and contamination. The notches were alloyed with the powdered mixture described in Table II as L2 and as L2M1 by brazing in the range of 2175°–2225° F. for one half hour. This brazing cycle was followed by a diffusion treatment in the range of 2000°–2125° F. for a period in the range of 8 to 15 hours, in this case, about 12 hours. The coupons in the form of tensile specimens were tested at temperatures in the range of 1400°–1800° F.; the coupons in the form of stress rupture specimens were tested at 1400° F./32 ksi, 1600° F./25 ksi and 1800° F./10 ksi. The following tables, which present data resulting from such testing, show that use of the alloys and mixtures of the present invention at least meet desirable mechanical properties for use with the base alloys tested.

TABLE V

| | AVERAGE TENSILE DATA | | | |
|---|---|---|---|---|
| SPECIMEN | Test Temp (°F.) | UTS (ksi) | YS (ksi) | ELONG (%) |
| MM302 Baseline | 1600 | 56.2 | 45.4 | 17.4 |
| L2 on MM302 | 1600 | 31.0 | (a) | 1.3 |
| L2M1 on MM302 | 1400 | 63.8 | 61.8 | 1.7 |
| L2M1 on MM302 | 1600 | 57.1 | 32.4 | 3.3 |
| L2M1 on MM302 | 1800 | 35.1 | 20.5 | 6.6 |
| L2 on WI52 | 1400 | 66.1 | 41.5 | 8.3 |
| L2 on WI52 | 1800 | 28.0 | 17.7 | 20.4 (b) |
| L2 on WI52 | 2000 | 15.3 | 9.6 | (c) |

(a) Specimen failed before 0.2% yield strength was reached
(b) Specimen failed near radius
(c) Specimen in three pieces after test

TABLE VI

| | AVG STRESS RUPTURE DATA | | | |
|---|---|---|---|---|
| SPECIMEN | Test Temp (°F.) | STRESS (ksi) | LIFE (hrs) | ELONG (%) |
| MM302 Baseline | 1600 | 25 | 52.2 | 12.9 |
| L2 on MM302 | 1600 | 25 | 62.7 | 23.9 |
| L2M1 on MM302 | 1600 | 25 | 58.8 | 20.4 |
| L2M1 on MM302 | 1800 | 10 | 141.4 | 7.4 |
| L2 on WI52 | 1400 | 32 | 87.4 | 15.6 |
| L2 on WI52 | 1800 | 10 | 35.6 | 12.3 |

In the above Tables V and VI and elsewhere in the description, "UTS" means "ultimate tensile strength," "YS" means "yield strength", "ksi" means "thousands per pounds per square inch", and "Elong" means "elongation".

In connection with the evaluation of L2M1 mixture with coupons of WI52 alloy and the testing of alloy mixture L2M1 with coupons of Mar M302 alloy, it was recognized that the microstructure of the brazed joint, after diffusion, matched and was compatible with that of the specimen coupon article alloy. For example, such microstructure consists of epitaxially crystallized regions at the interfaces and braze component-rich central area. The diffusion cycle was found to have effectively broken up the Chinese script phase into discrete particles. Throughout the repaired region of this cobalt base form of the present invention were finely dispersed Ta carbides, Ti carbides, Cr borides and Ta borides. There was very little interaction found between the boron and the base metal.

EXAMPLE 2

Coupons for testing were cut from cast boxes made of Rene' 80 nickel base superalloy consisting nominally, by weight, essentially of 0.17% C, 14% Cr, 5% Ti, 0.015% B, 3% Al, 4% W, 4% Mo, 9.5% Co, 0.06% Zr, with the balance Ni and incidental impurities. The melting range of Rene' 80 alloy is about 2300°–2375° F. Flat blanks, having a thickness of about 0.06", were cut to dimensions of 1½"×¾". In the preparation of test specimens, a pair of blanks were placed end to end, with a gap positioned in the range of about 0.003–0.010" to about 0.040" to simulate a tapered crack. This assembly was then tack welded at the ends of the blanks to hold the gap. Powdered mixtures from Table IV, for example SA-813 powder mixture, was placed in the tapered gap and heated in the range of about 2145° to 2225° F., about 2160° F. in the specific example using SA-813 mixture, for about 10–30 minutes to flow at least a portion of the mixture in the gap. This brazing cycle was followed by a diffusion treatment at a temperature in the range of 2000°–2125° F. for a period in the range of 8–15 hours. In the example using SA-813 powder mixture, the thermal cycle of about 2050° F. for 8 hours and 2110° F. for 5 hours was used. After machining the coupons to the form of tensile and stress rupture specimens, they were aged for about 4–8 hours in the temperature range of about 1550°–1600° F. for gamma prime strengthening.

The coupons in the form of tensile specimens were tested at 1600° F.; the coupons in the form of stress rupture specimens were tested at 1700° F./25 ksi and at 1600° F./25 ksi. The following Tables VII and VIII present data for testing of SA-813 mixture with Rene' 80 nickel base superalloy. Such data represent that the use of the mixtures of the present invention at specimen gaps or in cracks less than about 0.020 inch, at least meets mechanical properties for use with the nickel base superalloy tested.

TABLE VII

TENSILE DATA AT 1600° F.

| SPECIMEN | UTS (ksi) | 0.2% YS (ksi) |
| --- | --- | --- |
| Rene'80 Alloy (a) | 93 | 73 |
| SA-813 on Rene'80 (b) | 88.2 | 76.2 |

(a) coated with CODEP diffusion aluminum coating
(b) uncoated; specimen with 0.003" gap

TABLE VIII

STRESS RUPTURE DATA (at a stress of 25 ksi)

| SPECIMEN | TEST TEMP (°F.) | LIFE (hrs) |
| --- | --- | --- |
| Rene'80 Alloy (a) | 1700 | 140 |
| SA-813 on Rene'80 (b) | 1700 | 84 |
| SA-813 on Rene'80 (b) | 1700 | 208 |

TABLE VIII-continued

STRESS RUPTURE DATA (at a stress of 25 ksi)

| SPECIMEN | TEST TEMP (°F.) | LIFE (hrs) |
| --- | --- | --- |
| SA-813 on Rene'80 (b) | 1600 | 495 |

(a) coated with CODEP diffusion aluminum coating
(b) uncoated; specimen with 0.003" gap Observation of the microstructure of the brazed joints, prepared and tested in this example, matched and was compatible with the specimen coupon alloy. Epitaxial grain growth across bond lines was noted. The structure included slightly finer grains than the coupon alloy and included a gamma matrix with gamma prime $Ni_3$ (Al, Ti) and gamma-gamma prime $Ni_3$ Cb. The only borides noted in the matrix after diffusion treatment were rod like Ta borides, with a mixture of some minor amounts of script phase Cr borides in the grain boundaries. Throughout the repaired region there were finely dispersed Ti/Ta carbides. Very little interaction was found between the boron and base metal.

The mixture of the present invention provides the capability to repair alloy articles, particularly the higher strength cobalt base and nickel base superalloys of the type described above. Although, the present invention has been described in connection with specific examples and embodiments, it will be recognized by those skilled in the art the variations and modifications of which the present invention is capable without departing from its scope as represented by the appended claims.

What is claimed is:

1. An improved mixture of alloy powders for use in treating a preselected article alloy of predetermined composition range and based on an element selected from the group consisting of Ni and Co, at a temperature less than the incipient melting temperature of the article alloy;
    the mixture having at least three distinct groups of alloy powders together defining a mixture composition range;
    each alloy powder of the groups characterized by a composition and melting range different from the others and from the article alloy;
    a first of the groups having at least one alloy each with a melting range higher than the melting ranges of the alloys in other groups and further characterized by:
    (a) substantially all of elements selected from the group consisting of W and Mo, and
    (b) substantially all of any C included in the mixture composition;
    the second of the groups having at least one alloy each with a melting range lower than alloys in the first group, and further characterized by:
    (a) the substantial absence of elements selected from the group consisting of W and Mo, and
    (b) the substantial absence of C;
    the alloys of the second group comprising Cr, Al, and at least one element selected from the group consisting of Ni and Co; and
    a third of the groups having at least one eutectic alloy each with a melting range lower than alloys of the second group, the alloys of the third group being characterized by the substantial absence of C;
    the mixture composition range characterized by less than 2 wt. % total of elements selected from the group consisting of B and Si, less than 1 wt. % C, and including 15-30 wt. % Cr, 1-7 wt. % W, and 1-6 wt. % Ta.

2. The mixture of claim 1 in which the mixture composition range comprises, by weight, 15-30% Cr, 1.5-6.5% W, 0.4-4% Al, 1-11% Ti, 1-6 Ta, up to 1.5% B, up to 0.5% Si, up to 0.2% Zr, up to 3% Mo, up to 0.3% Hf, up to 6% Cb, up to 3% Re, with the balance selected from the group consisting of Ni and Co, along with incidental impurities.

3. The mixture of claim 2 wherein:
the first of the groups is characterized by the lower total weight percent of melting point depressants selected from the group consisting of B and Si when compared with powders in the second of the groups of the mixture; and
the mixture composition range consists essentially of, by weight, 15-30% Cr, 2-7% W, 0.4-1.5% Al, 1-4% Ti, 2-6% Ta, 0.5-2% B, up to 0.5% Si, up to 0.2% Zr, 9-15% Ni, with the balance Co and incidental impurities.

4. The mixture of claim 3 which consists nominally by weight, of 19-20% Cr, 3-4% W, 14-15% Ni, 0.4-0.6% Al, 1-2% Ti, 1-3% Ta, 1-1.5% B, with the balance Co and incidental impurities.

5. The mixture of claim 3 which consists nominally, by weight, of 15-≠% Cr, 6-7% W, 9-10% Ni, 0.3-0.5% Al, 1-2% Ti, 4-5% Ta, 1-1.2% B, with the balance Co and incidental impurities.

6. The mixture of claim 3 which consists nominally, by weight, of 25-30% Cr, 4-5% W, 9-10% Ni, 0.9-1.1% Al, 1-2% Ti, .5-6% Ta, 0.7-1% B, 0.2-0.4% Si, 0.1-0.2% Zr, with the balance Co and incidental impurities.

7. The mixture of claim 3 which consists nominally, by weight, of 20-23% Cr, 2-3% W, 9-10% Ni, 1-1.2% Al, 3-4% Ti, 2-4% Ta, 1.1-1.5% B, 0.2-0.3% Si, 0.1-0.2% Zr, with the balance Co and incidental impurities.

8. The mixture of claim 1 in which the mixture composition range consists essentially of, by weight, 15-25% Cr, 1.5-4% W, 0.5-4% Al, 2-11% Ti, 1-4% Ta, up to about 1% B, 2-30% Co, 1-3% Mo, 0.1-0.3 Hf, 0.5-6% Cb, up to 3% Re, with the balance Ni and incidental impurities.

9. The mixture of claim 1 which consists nominally, by weight, of 16-18% Cr, 3-5% W, 0.6-0.8% Al, 2-3% Ti, 3-4% Ta, 0.9-1.1% B, 25-30% Co, 1-1.5% Mo, 0.2-0.3% Hf, 0.5-1% Cb, with the balance Ni, and incidental impurities.

10. The mixture of claim 1 which consists nominally, by weight, of 18-20% Cr, 2-3% W, 3-4% Al, 2-3% Ti, 1-2% Ta, 0.2-0.3% B, 3-4% Co, 2-3% Mo, 0.2-0.3% Hf, 5-6% Cb, 1-2% Re, with the balance Ni and incidental impurities.

11. The mixture of claim 1 which consists nominally, by weight, of 16-18% Cr, 2-3% W, 3-4% Al, 6-7% Ti, 1-2% Ta, up to 0.2% B, 2-3% Co, 2-3% Mo, 0.2-0.3% Hf, 5-6% Cb, 1-2% Re, with the balance Ni and incidental impurities.

12. The mixture of claim 1 which consists nominally by weight, of 21-23% Cr, 1-2% W, 2-4% Al, 9-11% Ti, 1-2% Ta, 3-4% Co, 1-2% Mo, 0.1-0.2% Hf, 1-2% Cb, 1-2% Re, with the balance Ni and incidental impurities.

13. The mixture of claim 1 which consists nominally, by weight, of 16-18% Cr, 2-4% W, 3-4% Al, 7-8% Ti, 1-3% Ta, 0.05-0.15% B, 3-5% Co, 2-4% Mo, 0.2-0.4% Hf, 1-2% Cb, 1-3% Re, with the balance Ni and incidental impurities.

14. In a method of repairing a repair area of an article of an alloy of predetermined composition range and based on an element selected from the group consisting of Ni and Co, the steps of:
A. disposing at the repair area an improved mixture of alloy powders which can be used in treating the alloy of the article at a temperature less than the incipient melting temperature of the alloy;
(1) the mixture having at least three distinct groups of alloy powders together defining a mixture composition range;
(2) each alloy powder of the groups characterized by a composition and melting range different from the others and from the article alloy;
(3) a first of the groups having at least one alloy each with a melting range higher than the melting ranges of the alloys in other groups and further characterized by:
(a) substantially all of elements selected from the group consisting of W and Mo, and
(b) substantially all of any C included in the mixture composition;
(4) the second of the groups having at least one alloy each with a melting range lower than alloys in the first group, and further characterized by:
(a) the substantial absence of elements selected from the group consisting of W and Mo, and
(b) the substantial absence of C;
(c) the alloys of the second group comprising Cr, Al, and at least one element selected from the group consisting of Ni and Co; and
(5) a third of the groups having at least one eutectic alloy each with a melting range lower than alloys of the second group, the alloys of the third group being characterized by the substantial absence of C;
(6) the mixture composition range characterized by less than 2 wt. % total of elements selected from the group consisting of B and Si, less than 1 wt. % C, and including 15-30 wt. % Cr, 1-7 wt. % W, and 1-6 wt. % Ta;
B. heating the area below the incipient melting temperature of the alloy and in a first temperature range of about 2125°-2275° F. for a time sufficient to flow at least a portion of the powder mixture at the repair area; and thereafter,
C. heating the repair area in a second temperature range below the first temperature range for at least about 8 hours to diffuse at least a portion of the powder mixture with the alloy of the article and to provide the repair area microstructure with a fine dispersion of second phase borides or carbides or both.

15. The method of claim 14, for repair of a nickel base superalloy, in which, after heating at the second temperature, the repair area is aged for gamma prime strengthening.

16. The method of claim 15 in which the aging is conducted in a temperature range of about 1550°-1600° F. for about 4-8 hours.

17. The method of claim 14 in which:
the first temperature range is about 2145°-2225° F.;
the second temperature range is about 2000°-2125° F.; and
the repair area is held in the second temperature range for at least about 8 hours.

18. The method of claim 17 in which the repair area is held at the second temperature for about 8-15 hours.

19. A repaired article of a nickel base or cobalt base superalloy including a repair area treated in accordance with the method of claim 14, the repair area being characterized by a microstructure of a fine, discrete dispersion of second phase borides or carbides or both, and strength properties at least approaching the strength of the superalloy.

20. The article of claim 19 in which the repair area includes a repaired gap up to about 0.02 inch.

* * * * *